Patented Mar. 10, 1953

2,631,140

UNITED STATES PATENT OFFICE 2,631,140

MODIFIED PHENOLIC RESINS

Herman S. Bloch, Chicago, Ill., assignor to Universal Oil Products Company, Chicago, Ill., a corporation of Delaware No Drawing. Application July 19, 1951, Serial No. 237,689

6 Claims. (Cl. 260—51)

This application is a continuation in part of my copending application Serial No. 224,825, filed May 5, 1951, which in turn is a continuation in part of my application Serial No. 732,145, filed March 31, 1947, now abandoned.

The present invention relates to a process for the production of resinous and elastomeric materials characterized herein as modified phenolic resins, the particular modification over the usual phenolic resinous products being the presence of mono- and/or polyenic hydrocarbon substituents derived from a specific source of alkenyl and alkapolyenyl hydrocarbons utilized as alkenylating agents of the hydroxy aromatic reactant employed in the preparation of the present resinous product. More specifically the invention concerns a process for the production of resinous materials by the chemical condensation of a mono- or polyalkenyl or alkapolyenyl hydroxy aromatic derivative with a carbonyl compound selected from the group consisting of the aldehydes and ketones.

It is one object of the invention to provide a process for the production of high molecular weight phenolic resins containing unsaturated hydrocarbon radicals which lend particular properties to the resinous product and enable the latter to undergo polymerization and oxidation reactions and to enter into the molecular structure as a copolymer of the drying oil component of coating compositions in which the resin is incorporated when the coating composition is exposed to atmospheric oxygen and undergoes drying as a result thereof.

Another object of the invention is to provide resinous products which are tough, highly elastic and therefore especially desirable in the formulation of coating compositions where such properties are of advantage in increasing the durability and usefulness of coating films derived from such compositions.

In one of its embodiments the present invention comprises reacting an hydroxy aromatic compound containing at least three substitutable nuclear hydrogen atoms with a cyclic, polyolefinic hydrocarbon having conjugated and non-conjugated unsaturation and thereafter condensing the product consisting of mono- and polyalkenyl and alkapolyenyl phenols with a carbonyl compound selected from the group consisting of the aldehyde and ketones to form a resinous material.

In one of its more specific embodiments the present invention relates to a process for the production of a resinous material which comprises reacting a phenol containing at least three substitutable nuclear hydrogen atoms with a mixture of cyclic, olefinic hydrocarbons containing from about 2.5 to about 4 double bonds per molecule in conjugated and non-conjugated relationship to each other to form a mixture of phenolic compounds containing, in common, mono- and polyalkenyl and alkapolyenyl radicals and thereafter condensing said alkenyl phenolic compounds with a carbonyl reactant selected from the group consisting of the aldehydes and ketones in the presence of a basic condensation catalyst at a temperature of from about 25° to about 200° C. and at a pressure sufficient to maintain the reaction mixture substantially in liquid phase.

Other objects and embodiments of the invention will be referred to in greater detail in the following further description of the invention.

The alkenyl and polyalkenyl hydroxy aromatic compounds, such as an alkenylphenol, one of the primary reactants involved in the present process, is prepared by the reaction of particular cyclic, polyolefinic hydrocarbons having conjugated and non-conjugated unsaturation with an hydroxy aromatic compound containing at least three nuclearly substitutable hydrogen atoms. The cyclic, polyolefinic hydrocarbons utilized in the alkenylation reaction are derived from a specific source being the unsaturated hydrocarbon product recovered from a sludge formed in a conjunct polymerization reaction in which a non-aromatic hydrocarbon, generally an aliphatic or cyclic mono- or polyolefinic hydrocarbon or branched chain paraffin is contacted with a conjunct polymerization catalyst such as a Friedel-Crafts metal halide or a concentrated mineral acid, such as sulfuric or hydrofluoric acid at temperatures of from about −30° to about 200° C. to form a sluge phase comprising catalyst-hydrocarbon addition complexes from which said cyclic, polyolefinic hydrocarbons are recovered by decomposition of the resulting sludge in a manner suitable for retaining the highly unsaturated character of the cyclic, polyolefinic hydrocarbons or conjunct polymers. The cyclic, polyolefinic hydrocarbons produced thereby consist of a mixture of homologous hydrocarbons having an average molecular weight of from about 150 to about 450, the highest boiling components having molecular weights as high as about 1000. On the basis of infra-red and ultra-violet spectra examinations of the mixture of conjunct polymers, certain fractions thereof contain hydrocarbons described structurally as cyclopentene derivatives having attached to the cyclic nucleus alkyl, alkenyl and alkapolyenyl side chains in which the unsaturated double bonds are in conjugated and non-conjugated relationship to each other. Fractional portions of the mixture, such as the intermediate boiling fractions having boiling points of from about 200° to about 275° C. are generally and for most purposes more desirable in the preparation of the ultimate resinous product herein specified because of their greater degree of reactivity as conjugated dienes than the corresponding fractions of higher molecular weight. The products obtained on reacting said cyclic, polyolefinic hydrocarbons with hydroxy aromatic compounds containing substitutable nuclear hydrogen atoms are herein classed as alkenyl and cycloalkenyl as well as alkapolyenyl substituted phenolic compounds in which a portion of the original unsaturation of the hydrocarbons is retained, thus forming products having from 1 to as high as 3 olefinic double bonds in the alkenyl substituents. The latter unsaturation is believed to account for the valuable characteristics of the products of this invention in their ability to act as film-forming components in coating compositions in which the present resins are incorporated. The interpolymerization effects between the double bonded carbon atoms in the structure of the resin may also account for the tough, elastic properties of the dried films from such coating compositions, as well as for the enhanced drying speed and certain physical properties of the films such as hardness and abrasion resistance.

The hydroxy aromatic reactant utilized in the formation of the corresponding alkenyl derivatives thereof include not only the mono-cyclic compounds, that is, the benzenoid or phenolic hydroxy aromatic compounds, but the polycyclic or condensed ring aromatic series as well. Typical compounds of the hydroxy benzenoid series include phenol, the various alkyl and alkenyl derivatives thereof, such as the cresols, the polyhydroxy compounds such as resorcinol and phenols containing other substituents such as the halogen substituted phenols. In order to form the alkenyl derivatives of said hydroxy aromatic compounds by alkenylation thereof, it is essential that the aromatic nucleus be not substituted by other groups to such an extent that attachment of the alkenyl radical thereto during the alkenylation reaction is prevented by steric hindrance. The alkenylphenols must, further, be capable of reaction with carbonyl compounds, such as formaldehyde and hence cannot be substituted with radicals which interfere with the condensation of the reactive substituents. The hydroxyaromatic compound is therefore specified as containing at least three nuclearly substitutable hydrogen atoms. Of the polycyclic aromatic hydroxy compounds also utilizable in the alkenylation reaction, typical compounds of this class include the anthrols, phenanthrols and their substitution derivatives such as the hydroxy, halo, alkyl and other substituted polycyclic hydroxyaromatic compounds.

The condensation of the hydroxy aromatic reactant and the mixture of polyolefinic, cyclic hydrocarbons to form the corresponding alkenyl hydroxy aromatic derivative is effected in the presence of a suitable catalytic agent of the type generally known in the art as an alkylation catalyst of the acid-acting type. Typical of such catalysts are the Friedel-Crafts metal halides such as aluminum chloride, ferric chloride, zinc chloride, etc.; a solvent-modified Friedel-Crafts metal halide, stannic chloride dissolved in a solvent, such as a nitroparaffin or an addition complex of the halide with various organic compounds such as ethers, certain esters, ketones, etc. or addition compounds of boron trifluoride with such organic compounds. A typical catalyst of the latter type which is especially desirable in effecting the alkenylation reaction are the aluminum chloride complexes of certain oxygen-containing organic compounds, a typical complex of this type being the compound: aluminum chloride monomethanolate. Acid earths or clays of either synthetic or natural origin may also be used to catalyze the reaction.

The formation of the alkenyl hydroxy aromatic compound by alkenylation of a phenol or a polycyclic hydroxy aromatic compound with a cyclic, polyolefinic hydrocarbon, the product of which comprises one of the primary reactants in the present process, may be effected at temperatures of from about —20° to about 200° C., preferably at temperatures of from about 0° to about 125° C. for most of the alkylation catalysts hereinabove specified. Superatmospheric pressures, generally not in excess of about 100 atmospheres, are desirable in the alkenylation reaction to maintain the reactants and catalyst in substantially liquid phase and thereby maintain intimate contact between the reactants. Following the period of reaction in which the alkenyl derivatives of the hydroxy aromatic compound are formed, generally within a reaction period of from about 3 minutes to about 3 hours, the alkenyl hydroxy aromatic product may be separated from the reaction mixture by removal of the catalyst phase therefrom, water washing the product layer and separating desired fractions therefrom by fractional distillation of the product, preferably at a subatmospheric pressure to reduce the boiling point and eliminate thermal decomposition of the product. The product frequently comprises not only the mono-alkenyl and alkapolyenyl substituted derivatives but the di- and polyalkenyl derivatives as well. Both the mono- and polysubstituted derivatives are utilizable in the present process to form the resinous product herein provided, although the product obtained from the mono-alkenyl derivative usually, but not necessarily, possesses properties differing from the resinous product prepared from a polyalkenyl hydroxy aromatic compound. It has also been observed that the mono-substituted derivatives usually undergo condensation with the carbonyl compound more readily than the polysubstituted compounds, presumably because of the absence of steric hindrance effects; the mono-alkenyl derivative is therefore generally preferred in the present process, although not limited thereto. The polyalkenyl-substituted hydroxy aromatic compounds are necessarily of higher molecular weight and contain more numerous unsaturated bonds; the resinous products therefrom are therefore generally harder and in some cases, less pliable than the products prepared from the mono-alkenyl-substituted hydroxy aromatic reactants. The properties of the resin, however, are also dependent upon the influence of the carbonyl reactant, the molecular weight and unsaturation thereof as well as the number of substituents in its molecular structure also controlling the properties of the ultimate resinous product.

The reactant herein specified as a carbonyl compound utilized in the formation of the present resinous product may be an aldehyde or ketone, aliphatic, or cyclic, and of either saturated or unsaturated structure; the cyclic compounds may be either naphthenic or aromatic. Suitable ketones include such saturated members as acetone, methylethyl ketone, diethyl ketone, etc.; cyclic saturated ketones, such as methylcyclohexyl ketone; cyclic members wherein the carbonyl group is part of the ring, such as benzoquinone, cyclohexanone; unsaturated ketones, such as vinyl methylketone, ethylideneacetone, mesityl oxide, isophorone, etc.; aryl ketones, such as acetophenone, butyrophenone, etc.; alkenyl arylketones, such as propenyl phenyl ketone; polyketones, such as diacetyl or benzil and homologs of the above classes. Typical aldehydes of the corresponding classes enumerated above include such compounds as formaldehyde and acetaldehyde of the saturated aliphatic series, crotonaldehyde or acrolein of the unsaturated aliphatic series, benzaldehyde of the arylaldehydes, and heterocyclic aldehydes such as furfural. The polymers of formaldehyde such as trioxymethylene are particularly useful since the latter are liquid at relatively high temperatures and depolymerize during the reaction to yield the highly active carbonyl compound, formaldehyde. The aldehydes and ketones may also be employed in admixture with each other or several members of the same group may be used together. The carbonyl reactant may also contain other diverse radicals in addition to the carbonyl group in the structure of the compound, which result in various modifications in the properties of the ultimate resinous product. Such other radicals may be one or more of the group: halogen, nitro, amino, alkoxy, acyloxy, carboxy, carboxamide, or sulfonic acid radicals, which, although they do not enter into the condensation reaction directly with the hydroxy aromatic compound, nevertheless affect the melting point, solubility and other characteristics of the resin. In general, when utilizing an unsaturated carbonyl compound, as for example, a ketone or aldehyde wherein the carbonyl group is attached to an alkenyl residue, the products tend to have somewhat different properties than resins prepared from the corresponding saturated carbonyl reactants containing the same number of carbon atoms. As a rule, the products derived from the unsaturated series of reactants tend to have higher melting points due, it is believed, to incidental polymerization effects obtained between the double bonds of said reactants.

The condensation of a carbonyl reactant selected from the group consisting of the aldehydes and ketones with an alkenyl hydroxy aromatic compound is preferably effected in the presence of certain catalytic agents generally characterized as basic condensation catalysts. The latter may be selected from either the inorganic bases such as an aqueous or alcoholic solution of sodium or potassium hydroxide, sodium or potassium carbonate, an alkali metal alcoholate such as sodium methanolate, or, preferably, an organic base, and particularly, a basic nitrogen compound. Suitable organic bases include ammonia, ammonium hydroxide, amines, heterocyclic nitrogen bases, quaternary ammonium bases, hydroxy alkylamines, and the like. The amines include primary, secondary and tertiary aliphatic and aromatic amines such as alkyl, cycloalkyl, alkenyl amines, aryl amines, aralkyl amines, alkanolamines, etc.; typical examples of which are such compounds as dimethylamine, trimethylamine, triethanolamine, methylethylamine, dibutylamine, and homologs, aniline, methylphenylamine, cyclohexylmethylamine, and others. Heterocyclic nitrogen bases useful as catalysts in the condensation reaction include such compounds as pyridine, the picolines, the lutidines, quinoline, etc. The catalyst is introduced into the reaction mixture in sufficient quantity to result in at least a slightly basic reaction mixture, generally in amounts of from about 0.1 to about 10 weight per cent of the reaction mixture. When utilizing inorganic base catalysts, the quantity of catalyst is generally less than about 5% of the reaction mixture, whereas organic bases may be present in amounts up to about 10% of the reaction mixture. The catalyst may be subsequently removed from the resinous product by contacting the resinous reaction mixture with a solvent which has a selective solubility for the catalyst, such as water containing a mineral acid, or the resin may be dissolved away from the catalyst, as for example, by contacting the resin containing the catalyst with a hydrocarbon such as benzene which dissolves the resin but not the catalyst.

The condensation reaction may be conducted in the presence of a solvent for the reactants, the solvent tending to modify the rate of reaction and the character of the products obtained therefrom. In general, the aliphatic alcohols such as butyl alcohol, ethers, such as diethylether, esters, such as ethylacetate and hydrocarbon solvents such as benzene, toluene, etc. provide suitable solvents or diluents in which to conduct the reaction. The solvent may be added for the specific purpose of controlling the rate of reaction, as for example, where a solvent is chosen which vaporizes at the reaction temperature and thus maintains the temperature of the reaction at the boiling point of the solvent. The solvent may also form an azeotrope with the by-product water formed in the reaction and thus provide an effective means for removing the latter undesirable product from the reaction mixture.

The resin-forming reaction of the present process may be effected at temperatures of from about 25° to about 200° C. and preferably from about 40° to about 125° C. and at pressures sufficient to maintain the reactants in substantially liquid phase. The proportion of carbonyl compound to alkenyl hydroxy aromatic compound utilized in the reaction mixture may vary from about 0.5 to about 2 molecular proportions thereof. It is generally preferred to maintain the ratio of carbonyl compound to alkenyl hydroxy aromatic reactant within the range of from about 0.7 to about 1.2 moles per mole, as the resinous products obtained thereby generally possess more of the desirable characteristics of such resins. In general, lowering said above ratio results in the production of a soft resinous material whereas increasing the ratio tends to produce resins of hard, brittle characteristics. Within the range specified, the resins may vary from soft resins or fluid resinoids to hard, tough elastic products, depending upon the degree of condensation desired for the particular use intended. In either case, the resins possess the ability to condense and polymerize further by the action of heat and pressure with or without polymerization or condensation catalysts such as peroxides, organic acids or bases, or acid-acting salts like zinc chloride.

The residual unsaturation contained in the resinous product is believed to account for the ability of the resins to undergo further polymerization under the influence of heat, pressure, etc. For similar reasons, the products may be vulcanized in the presence of sulfur when subjected to heat, pressure and in the presence of suitable accelerators. Because of the unusual combination of properties found in the present resinous products, they find wide use as molding materials, coatings, rubber additives, adhesives and impregnants for cloth, wood and paper, as for example in the manufacture of laminated products. The quality of the resins may be varied within wide limits to secure products of almost any specified properties varying in hardness, solubility, setting time, etc. by the regulation of the reactant ratios in the condensation reaction, the type and boiling range of the polyolefinic, cyclic hydrocarbon utilized as the alkenylating agent in the formation of the alkenyl derivatives of the hydroxy aromatic compound, the nature and amount of catalyst used, the degree of reaction, etc. Further variations may be obtained by blending the product with resins of other types, especially urea-aldehyde, melamine-aldehyde, and other phenolic resins. These may be blended in the finished state or the aldehyde reaction may be carried out on a mixture of the alkenyl hydroxy aromatic compound with other substituted phenols or with urea, thio-urea, melamine, amino-sulfonamides and like materials capable of forming resinous condensation products with aldehydes.

The present invention is further illustrated and typical products obtained by means of the present process are characterized in the following examples wherein certain members of the generally broad classes of reactants, catalysts and reaction conditions are specified for the purpose of indicating the method of obtaining the present resinous product, but not with any intention of limiting the generally broad scope of the invention in accordance therewith.

*Example I*

A mixture of polyolefinic cyclic hydrocarbons containing conjugated and non-conjugated unsaturation, also hereinabove characterized as conjunct polymers, was prepared in accordance with the following procedure.

22 liters (16.5 kg.) of non-selective-copolymer hydrocarbons having a bromine number of 162 (polymers of mixed butylenes and propylene referred to as a polymer gasoline) consisting predominantly of mono-olefinic hydrocarbons containing from about 8 to about 12 carbon atoms per molecule was charged into an autoclave and rapidly stirred as 9.0 kg. of liquid anhydrous hydrogen fluoride was introduced into the reactor. The pressure was maintained throughout the reaction at an average value of about 205 p. s. i. g. by means of compressed nitrogen. The temperature was increased to 91° C. and stirring was continued for an additional hour. The reaction mixture separated into two phases on standing; an upper saturated hydrocarbon layer (bromine number=10) and a lower acidic sludge layer.

The lower layer product weighed 16.1 kg. after removal of entrained "upper layer" by extracting the latter with liquid pentane and was a light brown mobile fluid having a density of 0.98 at 4° C. Its yield, based on the total charge, was 63 percent.

100 g. of the above hydrogen fluoride sludge was allowed to flow into a mixture of ice and water, additional ice being added as the heat of reaction melted the ice in the hydrolyzing reactor. 43.4 g. of a light-colored, sweet-smelling oil separated from the aqueous phase, a yield of 42.2% based on the original olefin charged and 43.4% based on the weight of sludge hydrolyzed. An examination of the oil indicated the following properties:

| | |
|---|---|
| Boiling range | 160° to above 400° C. |
| Density, $d_4^{20}$ | 0.803 |
| Molecular weight, average | 263 |
| Diene number | 85 |
| Bromine number | 195 |
| Double bonds/molecule (average) | 3.2 |

Although the mixture of polyolefinic, cyclic hydrocarbons described in the above preparation was prepared from a hydrogen fluoride sludge and was recovered therefrom by an aqueous hydrolysis procedure, a somewhat similar material may be obtained from an aluminum chloride or sulfuric acid sludge prepared in similar fashion. The polyolefinic, cyclic hydrocarbons may also be recovered from the hydrogen fluoride sludge by methods other than the aqueous hydrolyzing procedure. For example, the sludge may be catalytically decomposed by vaporizing the hydrogen fluoride from the sludge in the presence of certain catalysts which promote the decomposition of the hydrocarbon-HF complexes contained in the sludge.

The mixture of polyolefinic, cyclic hydrocarbons obtained in the above conjunct polymerization reaction was fractionally distilled at a subatmospheric pressure (5 mm. Hg, absolute) to separate a fraction therefrom boiling from about 200° to about 275° C. at normal pressure, the hydrocarbons therein having an average molecular weight of about 176. 0.275 mole of the latter fraction and a molar equivalent (26 grams) of phenol were weighed into a tared three-neck flask immersed in an oil bath, swept out with nitrogen and stirred while heating to about 100° C. To this mixture was added dropwise while stirring was continued, approximately 10 weight-per cent of the reaction mixture of a liquid catalyst consisting of a boron trifluoride-diethylether complex. The reaction was allowed to continue for five hours; the mixture was then allowed to cool to room temperature and washed with a dilute solution of sodium carbonate to remove the catalyst component. The product was dried over sodium sulfate and distillated at a pressure of 5 mm. Hg absolute. The yield of alkenyl phenols obtained from the above alkenylation reaction was approximately 81.2% based on the weight of reactants involved. A monoalkenyl fraction boiling from about 358° to about 400° C. (at 760 mm. pressure) was separated and utilized for the subsequent condensation reaction to form a resinous product.

1.0 mol of the mono-alkenylated phenol product is admixed with trioxymethylene in an amount sufficient to provide a molar equivalent of formaldehyde in the reaction mixture. To this mixture is added 1% by weight thereof of pyridine as a catalyst and the resulting mixture heated to a temperature of approximately 85° C. A viscous reaction product is soon formed which on further reaction at the indicated conditions forms a flexible resinous mass having rubber-like properties. The product is subject to vulcanization and consequent hardening by incorporating from 1 to 10% by weight of sulfur therein and heating under pressure at a temperature of 150° C.

*Example II*

A reaction mixture consisting of 0.7 mol of mono-alkenylated phenol and 1.0 mol of isophorone heated to a temperature of 110° C. for four hours in the presence of 0.1 volume proportion of the reaction mixture of a 10% alcoholic solution of sodium ethanolate forms a hard resinous mass, soluble in toluene. The toluene solution may be washed with an aqueous solution of hydrochloric acid to remove the alcohol and basic catalyst from the reaction mixture and the dried toluene solution evaporated to recover the resinous product.

I claim as my invention:

1. A process for the production of a resinous product which comprises reacting a mixture of mono- and polyalkenyl and alkapolyenyl phenols with a carbonyl compound selected from the group consisting of the aldehydes and ketones in the presence of a basic condensation catalyst at a temperature of from about 25° C. to about 200° C. and in the molecular ratio of said carbonyl compound to said phenols of from about 0.5 to about 2, said phenols being the condensation product of a hydroxy aromatic compound containing at least three substitutable nuclear hydrogen atoms with a mixture of cyclic polyolefinic hydrocarbons having conjugated and non-conjugated unsaturation in the same molecule.

2. A process for the production of a resinous product which comprises reacting a mixture of mono- and polyalkenyl and alkapolyenyl phenols with a carbonyl compound selected from the group consisting of the aldehydes and ketones in the presence of a basic condensation catalyst at a temperature of from about 40° C. to about 125° C. and in the molecular ratio of said carbonyl compound to said phenols of from about 0.7 to about 1.2, said phenols being the condensation product of a hydroxy aromatic compound containing at least three substitutable nuclear hydrogen atoms with a mixture of cyclic polyolefinic hydrocarbons having conjugated and non-conjugated unsaturation in the same molecule.

3. The process of claim 1 further characterized in that said alkenyl and alkapolyenyl phenols and said carbonyl compound are reacted in the presence of an aqueous alkali metal base as said condensation catalyst.

4. The process of claim 1 further characterized in that said carbonyl compound is formaldehyde.

5. The process of claim 1 further characterized in that said basic condensation catalyst is an organic amine.

6. The process of claim 5 further characterized in that said organic amine is pyridine.

HERMAN S. BLOCH.

REFERENCES CITED

The following references are of record in the file of this patent:

UNITED STATES PATENTS

| Number | Name | Date |
|---|---|---|
| 2,570,513 | Bloch | Oct. 9, 1951 |